United States Patent
Fujita et al.

(10) Patent No.: US 11,312,241 B2
(45) Date of Patent: Apr. 26, 2022

(54) POWER SUPPLY SYSTEM FOR ELECTRIC MOTOR CAR

(71) Applicants: Kabushiki Kaisha Toshiba, Minato-ku (JP); Toshiba Infrastructure Systems & Solutions Corporation, Kawasaki (JP)

(72) Inventors: Tsunehito Fujita, Fuchu (JP); Yuki Shirasawa, Inagi (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 10 days.

(21) Appl. No.: 17/049,506

(22) PCT Filed: Apr. 18, 2019

(86) PCT No.: PCT/JP2019/016617
§ 371 (c)(1),
(2) Date: Oct. 21, 2020

(87) PCT Pub. No.: WO2019/208383
PCT Pub. Date: Oct. 31, 2019

(65) Prior Publication Data
US 2021/0170879 A1 Jun. 10, 2021

(30) Foreign Application Priority Data

Apr. 23, 2018 (JP) .............................. JP2018-082624

(51) Int. Cl.
*B60L 9/00* (2019.01)
*B60L 53/24* (2019.01)
(Continued)

(52) U.S. Cl.
CPC ................. *B60L 9/00* (2013.01); *B60L 13/00* (2013.01); *B60L 53/24* (2019.02); *B61C 3/02* (2013.01);
(Continued)

(58) Field of Classification Search
CPC .. B60L 9/00; B60L 13/00; B60L 53/24; B60L 7/16; H02P 27/06; Y02T 10/7072;
(Continued)

(56) References Cited

U.S. PATENT DOCUMENTS

2012/0112669 A1* 5/2012 Kitanaka ................... B60L 9/22
318/3
2013/0229052 A1* 9/2013 Kitanaka ................. B60L 3/003
307/9.1
(Continued)

FOREIGN PATENT DOCUMENTS

EP 2 241 472 A1 10/2010
EP 2875982 A1 5/2015
(Continued)

OTHER PUBLICATIONS

International Search Report dated Jul. 16, 2019 in PCT/JP2019/016617 filed Apr. 18, 2019, 2 pages.
(Continued)

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

According to an embodiment, a power supply system for an electric motor car includes a first terminal, a second terminal, and a conversion unit. The first terminal is electrically connected to one of a power storage device and an overhead wire provided within a formation of electric motor cars. The second terminal is electrically connected to a lead wire
(Continued)

together with a plurality of electric motors within the formation, a host power supply device, an external power supply device different from the host power supply device. The conversion unit receives first electric power supplied from the plurality of electric motors and the external power supply device via the second terminal and causes a direct current (DC) voltage to be generated at the first terminal according to a regenerative operation of the conversion unit to charge the power storage device in a first operation state and receives second electric power supplied from one of the power storage device and the overhead wire via the first terminal, converts a part of the second electric power into third electric power according to a powered operation of the conversion unit, and outputs the third electric power from the second terminal in a second operation state, thereby converting electric power.

6 Claims, 2 Drawing Sheets

(51) Int. Cl.
    *B60L 13/00*     (2006.01)
    *B61C 3/02*     (2006.01)
    *H02J 7/04*     (2006.01)
    *H02J 7/16*     (2006.01)
    *H02P 27/06*     (2006.01)

(52) U.S. Cl.
    CPC .................. *H02J 7/04* (2013.01); *H02J 7/16* (2013.01); *H02P 27/06* (2013.01)

(58) Field of Classification Search
    CPC . Y02T 30/00; Y02T 90/14; B61C 3/02; H02J 7/16; Y04S 30/12
    See application file for complete search history.

(56) References Cited

U.S. PATENT DOCUMENTS

| | | | | |
|---|---|---|---|---|
| 2014/0207322 | A1* | 7/2014 | Hatanaka | B60L 50/30 |
| | | | | 701/22 |
| 2015/0266384 | A1* | 9/2015 | Kitanaka | B60L 50/40 |
| | | | | 318/400.3 |

FOREIGN PATENT DOCUMENTS

| | | |
|---|---|---|
| EP | 3450244 A1 | 3/2019 |
| JP | 8-251835 A | 9/1996 |
| JP | 10-174202 A | 6/1998 |
| JP | 2006-174573 A | 6/2006 |
| JP | 2010-252524 A | 11/2010 |
| JP | 2012-37359 A | 2/2012 |
| JP | 2014-93791 A | 5/2014 |
| WO | WO 2017/188057 A1 | 11/2017 |

OTHER PUBLICATIONS

Search Report issued in European Patent Application No. 19792224.8 dated Dec. 17, 2021 (9 pages).

* cited by examiner

POWER SUPPLY SYSTEM FOR ELECTRIC MOTOR CAR

TECHNICAL FIELD

Embodiments of the present invention relate to a power supply system for an electric motor car.

Priority is claimed on Japanese Patent Application No. 2018-82624, filed Apr. 23, 2018, the content of which is incorporated herein by reference.

BACKGROUND ART

A power supply system for an electric motor car operates a voltage of an overhead wire (hereinafter referred to as an overhead wire voltage) as a power supply during normal times and supplies electric power to an electric motor of an electric motor car which forms a formation. Also, a power storage device may be provided within the formation to reduce an influence of a power failure of the overhead wire and the power storage device may be operated as the power supply during non-normal times when the overhead wire voltage is lost. However, when the power storage device and a dedicated charging device for the power storage device are mounted within the above-mentioned formation, it may be difficult to install these devices due to a limited installation space or the like.

CITATION LIST

Patent Literature

[Patent Literature 1]
Japanese Unexamined Patent Application, First Publication No. 2014-93791

SUMMARY OF INVENTION

Technical Problem

An objective of the present invention is to provide a power supply system for an electric motor car that is simply formed.

Solution to Problem

According to an embodiment, a power supply system for an electric motor car includes a first terminal, a second terminal, and a conversion unit. The first terminal is electrically connected to one of a power storage device and an overhead wire provided within a formation of electric motor cars. The second terminal is electrically connected to a lead wire together with a plurality of electric motors within the formation, a host power supply device, an external power supply device different from the host power supply device. The conversion unit converts electric power between the first terminal and the second terminal under an operation state between a first operation state and a second operation state. In the first operation state, the conversion unit receives first electric power supplied from the plurality of electric motors and the external power supply device via the second terminal and causes a direct current (DC) voltage to be generated at the first terminal according to a regenerative operation of the conversion unit to charge the power storage device. In the second operation state, the conversion unit receives second electric power supplied from one of the power storage device and the overhead wire via the first terminal, converts a part of the second electric power into third electric power according to a powered operation of the conversion unit, and outputs the third electric power from the second terminal.

DESCRIPTION OF EMBODIMENTS

Hereinafter, a power supply system for an electric motor car according to an embodiment will be described with reference to the drawings. Also, in the following description, components having the same or similar functions are denoted by the same reference signs and redundant description of those components may be omitted.

First Embodiment

First, a configuration of a power supply system 1 for an electric motor car will be described.

Figure 1:
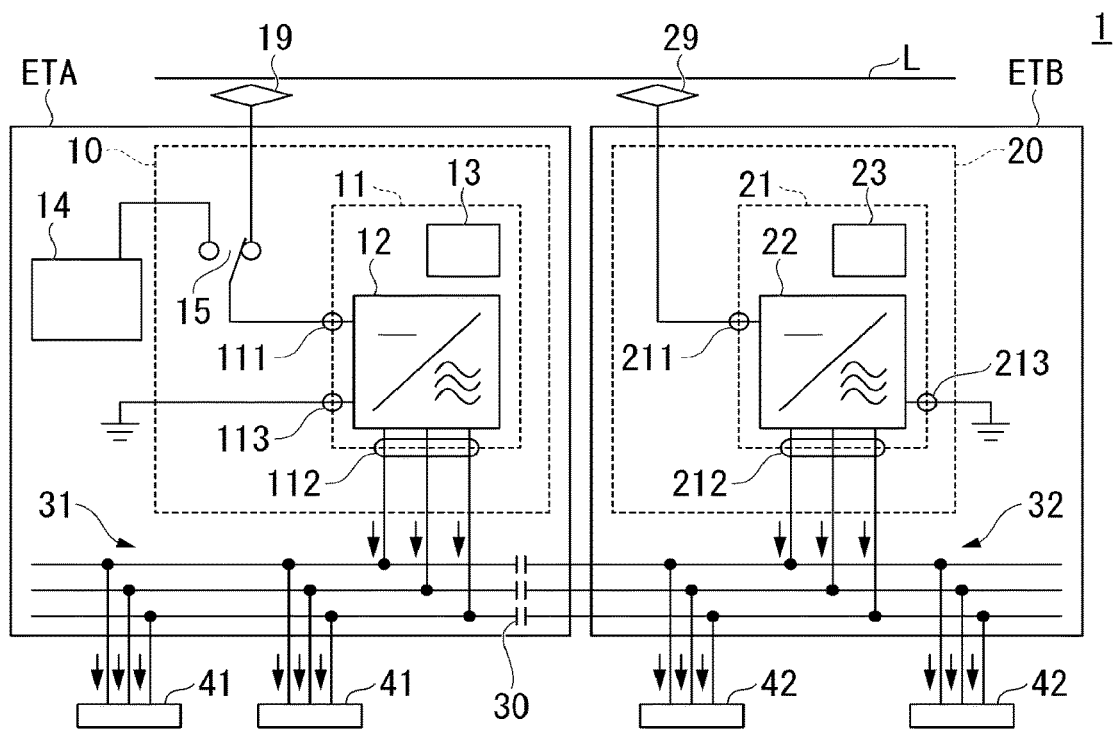
FIG. 1 is a configuration diagram of a power supply system for an electric motor car according to a first embodiment.

FIG. 1 is a configuration diagram of a power supply system for an electric motor car including a power supply system for an electric motor car according to the first embodiment.

The power supply system 1 for the electric motor car is applied to a formation including a plurality of electric motor cars and supplies electric power from a power supply to an electric motor of the electric motor car. An electric motor car ETA and an electric motor car ETB are examples of the electric motor car. The number of electric motor cars is not limited to two shown in FIG. 1 and can be appropriately changed. DC power is supplied to an overhead wire L relating to the electric motor car ETA and the electric motor car ETB.

The power supply system 1 for the electric motor car includes a power conversion device 10, a power conversion device 20, lead wires 31 and 32, and a power receiving and feeding contactor device 30. The power conversion device 10 and the power conversion device 20 are examples of a power supply device for an electric motor car. An outline of the power conversion device 10 and the power conversion device 20 will be described.

The power conversion device 10 is provided in the electric motor car ETA and supplies electric power to a plurality of electric motors 41 provided in the electric motor car ETA and the power conversion device 20. Also, the number of electric motors 41 is not limited to the number shown in FIG. 1 and can be appropriately changed.

For example, the power conversion device 10 includes a power supply device 11 for the electric motor car, a power storage device 14, and a switch 15.

The power supply device 11 for the electric motor car functions as a power conversion device for supplying electric power to the plurality of electric motors 41 and the like and further functions as a power conversion device for charging the power storage device 14. The power supply device 11 for the electric motor car is an inverter that converts DC power into alternating current (AC) power and has a regenerative function. Detailed description of the power supply device 11 for the electric motor car will be given below.

The power storage device 14 is a secondary battery having capacitance capable of holding an amount of electric power required to drive a plurality of electric motor cars. A positive electrode side of the power storage device 14 shown in FIG. 1 is connected to the switch 15 and a negative electrode side thereof is grounded to a body of the electric motor car ETA. The power storage device 14 may include a plurality of cell batteries (not shown) and include a battery monitoring unit (not shown) that detects states of the plurality of cell batteries. For example, the power storage device 14 may be disposed outside a housing (not shown) of the power conversion device 10. In this case, the power storage device 14 may be stored in a battery box (not shown). The power storage device 14 may be provided in the electric motor car ETA and is not limited to being provided in another electric motor car.

The switch 15 includes a first electrode connected to the power collecting device 19, a second electrode connected to the positive electrode of the power storage device 14, and a common electrode connected to a first terminal 111 of the power supply device 11 for the electric motor car. The switch 15 switches a connection destination of the first terminal 111 of the power supply device 11 for the electric motor car to one of the power collecting device 19 and the power storage device 14 by switching an electrical connection destination of the common electrode to one of the first electrode and the second electrode according to control of the control unit 13. Also, the switch 15 may be incorporated in the power supply device 11 for the electric motor car. However, maintainability can be improved by providing the switch 15 and the power supply device 11 for the electric motor car separately and providing the switch 15 on a DC link.

The power conversion device 20 is provided in the electric motor car ETB and supplies electric power to a plurality of electric motors 42 provided in the electric motor car ETB and the power conversion device 10. Also, the number of electric motors 42 is not limited to the number shown in FIG. 1 and can be appropriately changed. For example, the power conversion device 20 includes a power supply device 21 for the electric motor car.

Next, details of each part of the power conversion device 10 will be described.

The power supply device 11 for the electric motor car includes the first terminal 111, a second terminal 112, a ground terminal 113, an inverter 12 (a conversion unit), and a control unit 13.

For example, the first terminal 111 is connected to one of the power storage device 14 and the overhead wire L provided within the above formation via the switch 15. The second terminal 112 is electrically connected to the lead wire 31. The ground terminal 113 is grounded via the body of the electric motor car ETA.

Also, the plurality of electric motors 41, the power supply device 11 for the electric motor car (a host power supply device), and a first terminal of the power receiving and feeding contactor device 30 are connected to the lead wire 31. The lead wire 32 is connected to a second terminal of the power receiving and feeding contactor device 30. The lead wire 32 is electrically connected to the power supply device 21 for the electric motor car (an external power supply device) and the plurality of electric motors 42. For example, the lead wire 31 and the lead wire 32 each have a three-wire type three-phase AC cable. When the power receiving and feeding contactor device 30 is in a conductive state, the lead wire 31 and the lead wire 32 are electrically connected.

The inverter 12 is formed so that the first terminal 111 side can transmit and receive DC power and the second terminal 112 side can transmit and receive AC power. The inverter 12 receives first electric power supplied from at least one of the plurality of electric motors described above and the power supply device 21 for the electric motor car via the second terminal 112 and causes a DC voltage to be generated at the first terminal 111 according to its own regenerative operation to charge the power storage device 14. This operation state is referred to as a first operation state of the inverter 12. The plurality of electric motors described above include the plurality of electric motors 41 and the plurality of electric motors 42. The inverter 12 receives second electric power supplied from one of the power storage device 14 and the overhead wire L via the first terminal 111 and converts a part of the second electric power into the third electric power according to its own powered operation. The inverter 12 outputs the third electric power from the second terminal 112. This operation state is referred to as a second operation state of the inverter 12. The inverter 12 converts electric power between the first terminal 111 and the second terminal 112 under at least one of the first operation state and the second operation state described above. An arrow of FIG. 1 shows an example of a direction in which electric power is supplied in the second operation state.

The control unit 13 collects data regarding a state of each part within the power conversion device 10 and controls each part within the power conversion device 10 on the basis of the data and the like.

For example, the control unit 13 collects data representing whether the state of the switch 15 is a state in which the switch 15 electrically connects the first terminal 111 to the power storage device 14 or a state in which the switch 15 electrically connects the first terminal 111 to the overhead wire L. The control unit 13 collects data regarding an operation state, an output current, an input voltage, and an output voltage of the inverter 12 and the like. The control unit 13 collects data representing whether the power collecting device 19 is in contact with the overhead wire L or is separated from the overhead wire L. The control unit 13 collects data regarding a state of charge of the overhead wire L with which the power collecting device 19 is in contact. The control unit 13 collects data regarding an amount of charge of the power storage device 14, a terminal voltage, a quality determination result, and the like. The control unit 13 controls the operation state of the inverter 12. The control unit 13 controls the power collecting device 19 so that the power collecting device 19 is allowed to be in contact with the overhead wire L. The control unit 13 controls the switch 15 so that a connection destination of the switch 15 is switched. The control unit 13 controls the power storage device 14 so that charging or discharging of the power storage device 14 is permitted.

Next, details of each part of the power conversion device 20 will be described.

The power supply device 21 for the electric motor car includes a first terminal 211, a second terminal 212, a ground terminal 213, an inverter 22 (a conversion unit), and a control unit 23.

The first terminal 211 is connected to the overhead wire L. The second terminal 212 is electrically connected to the lead wire 32. The ground terminal 213 is grounded via the body of the electric motor car. Also, the plurality of electric motors 42, the power supply device 21 for the electric motor car (the host power supply device), and the second terminal of the power receiving and feeding contactor device 30 are connected to the lead wire 32.

The inverter 22 is formed in a manner similar to that of the inverter 12, the first terminal 211 side is formed so that the first terminal 211 side can transmit and receive DC power, and the second terminal 212 side is formed so that the second terminal 212 side can transmit and receive AC power. The inverter 22 receives the first electric power supplied from the plurality of electric motors described above via the second terminal 212, causes a DC voltage to be generated at the first terminal 211 according to its own regenerative operation, and transmits the electric power to the overhead wire L.

This operation state is referred to as a first operation state of the inverter 22. The plurality of electric motors described above include the plurality of electric motors 41 and the plurality of electric motors 42. The inverter 22 receives the second electric power supplied from the overhead wire L via the first terminal 211 and converts a part of the second electric power into the third electric power according to its own powered operation. The inverter 22 outputs the third electric power from the second terminal 212. This operation state is referred to as a second operation state of the inverter 12. The inverter 22 converts electric power between the first terminal 211 and the second terminal 212 under at least one of the first operation state and the second operation state described above.

The control unit 23 collects data regarding the state of each part within the power conversion device 20 and controls each part within the power conversion device 20 on the basis of the data and the like.

For example, the control unit 23 collects data regarding an operation state, an output current, an input voltage, and an output voltage of the inverter 22 and the like. The control unit 23 collects data representing whether the power collecting device 29 is in contact with the overhead wire L or is separated from the overhead wire L. The control unit 23 collects data regarding the state of charge of the overhead wire L with which the power collecting device 29 is in contact.

The control unit 23 controls the operation state of the inverter 12. The control unit 23 controls the power collecting device 29 so that the power collecting device 29 is allowed to be in contact with the overhead wire L.

The operation of the power supply system 1 for the electric motor car will be described.

Several operation states are defined in the power supply system 1 for the electric motor car and will be sequentially described.

Initially, the basic operation state will be described. The basic operation state is selected when electric power is received from the overhead wire L.

For example, the control unit 13 performs the following control in the basic operation state.

The control unit 13 causes the power collecting device 19 to be in contact with the overhead wire L. The control unit 13 switches the switch 15 so that the overhead wire L side is selected. According to this control, the inverter 12 and the overhead wire L are electrically connected by the switch 15. If the overhead wire L is in a voltage-applied state, the voltage of the overhead wire L is applied to the first terminal 111 of the inverter 12. For example, when the voltage is a voltage into which the electric power from the overhead wire L can be converted, the control unit 13 operates the inverter 12 in the powered operation. Thereby, the inverter 12 converts the electric power received from the overhead wire L and supplies a part of the electric power to the electric motor 41 and the like.

The control unit 23 also performs the following control when the basic operation state is set. The control unit 23 electrically connects the inverter 22 to the overhead wire L by causing the power collecting device 19 to be in contact with the overhead wire L. If the overhead wire L is in a voltage-applied state, the voltage of the overhead wire L is applied to the first terminal 211 of the inverter 22. Similar to the control unit 13, the control unit 23 causes the inverter 22 to be operated in the powered operation. Thereby, the inverter 22 converts the electric power received from the overhead wire L and supplies a part of the electric power to the electric motor 42 and the like.

Next, the first operation state will be described. The first operation state is selected when the power storage device 14 is discharged. The control unit 13 performs the following control when the first operation state is set.

The control unit 13 controls the switch 15 so that the switch 15 performs a switching operation of selecting the power storage device 14. According to this control, the switch 15 electrically connects the inverter 12 and the power storage device 14. The control unit 13 permits the power storage device 14 to be discharged. Thereby, the inverter 12 uses the power storage device 14 as a power supply, converts the electric power from the power storage device 14, and supplies the electric power to each part. With this discharging operation, an amount of electric power stored in the power storage device 14 decreases.

Next, the second operation state will be described. The second operation state is selected when the power storage device 14 is charged. The control unit 13 performs the following control when the second operation state is set.

The control unit 13 controls the switch 15 so that the switch 15 performs a switching operation of selecting the power storage device 14. According to this control, the switch 15 electrically connects the inverter 12 and the power storage device 14. The control unit 13 further causes the conversion operation (the powered operation) of the inverter 12 for converting the AC power into the DC power to be stopped and enables the regenerative operation.

Also, the power supply system 1 for the electric motor car can adjust a power supply range depending on a conductive state of the power receiving and feeding contactor device 30. For example, when the power receiving and feeding contactor device 30 is turned off, the lead wires 31 and 32 are separated by the power receiving and feeding contactor device 30. The power receiving and feeding contactor device 30 can independently control voltages of the lead wires 31 and 32 by separating the lead wires 31 and 32.

When the power receiving and feeding contactor device 30 makes the lead wires 31 and 32 conductive, both voltages of the lead wires 31 and 32 change. For example, even if the supply of the AC power to one of the inverters 12 and 22 is stopped, AC power for compensating for stopping can be supplied from the other to both the lead wires 31 and 32.

Further, the inverter 12 can convert a part of the electric power from the inverter 22 and charge the power storage device 14 by stopping the supply of the AC power of the inverter 12 and causing the regenerative operation to be performed.

According to the above embodiment, the power conversion device 10 includes the first terminal 111, the second terminal 112, and the inverter 12. The first terminal 111 is electrically connected to one of the power storage device 14 and the overhead wire L provided within the formation of the electric motor cars. The plurality of electric motors 41 and the like within the formation, the power conversion device 10, and the power conversion device 20 different from the power conversion device 10 are electrically connected to the lead wires 31 and 32 and the second terminal 112 is electrically connected to the lead wire 31.

The inverter 12 converts electric power between the first terminal and the second terminal under one operation state between the first operation state and the second operation state.

Under the first operation state, the inverter 12 receives the first electric power supplied from at least one of the plurality of electric motors 41 and the like and the power conversion device 20 via the second terminal and causes a DC voltage to be generated at the first terminal 111 according to the regenerative operation of the inverter 12 to charge the power storage device 14. Under the second operation state, the inverter 12 receives the second electric power supplied from one of the power storage device 14 and the overhead wire L via the first terminal 111, converts a part of the second electric power into third electric power according to the powered operation of the inverter 12, and outputs the third electric power from the second terminal 112. Thereby, the plurality of electric motors 41 and the like can be driven with the electric power with which the power storage device 14 is charged.

Also, according to the above-described embodiment, the power conversion device 10 can supply electric power to a load such as the electric motor 41 regardless of the presence or absence of the voltage of the overhead wire using the power storage device 14 as a power supply when the voltage of the overhead wire L is lost in an emergency or the like. The power conversion device 10 can be operated with the electric power of the power storage device 14.

Also, the power conversion device 10 can use electric power generated according to the regenerative operation of the inverter 12 to charge the power storage device 14 by switching the switch 15. In this manner, the power supply device 11 for the electric motor car can also serve as a charging device for the power storage device 14 without separately providing a dedicated charging device connected to the power storage device 14 and the power supply device 11 for the electric motor car that is simply formed can be provided. Accordingly, it is possible to improve maintainability and achieve an economic effect as described above.

Also, the above-described power supply system 1 for the electric motor car enables the power storage device 14 to be charged and discharged without separately providing a dedicated charging device connected to the power storage device 14 as long as the power storage device 14 can be provided even if a sufficient outfitting space cannot be secured inside or under the floor of the electric motor car ETA.

Also, in the above-described power supply system 1 for the electric motor car, the power receiving and feeding contactor device 30 is provided between the power conversion device 10 and the power conversion device 20. The switch 15 may perform a switching operation between power reception from the overhead wire L and charging of the power storage device 14 while the power receiving and feeding contactor device 30 is in a conductive state. In this manner, if the switch 15 can be operated, a procedure of performing a switching operation between the power reception from the overhead wire L and the charging of the power storage device 14 can be simplified.

Second Embodiment

A second embodiment will be described in detail with reference to the drawings. In the second embodiment, an example of application to an AC feeding scheme will be described. Hereinafter, differences from the first embodiment will be mainly described.

Figure 2:
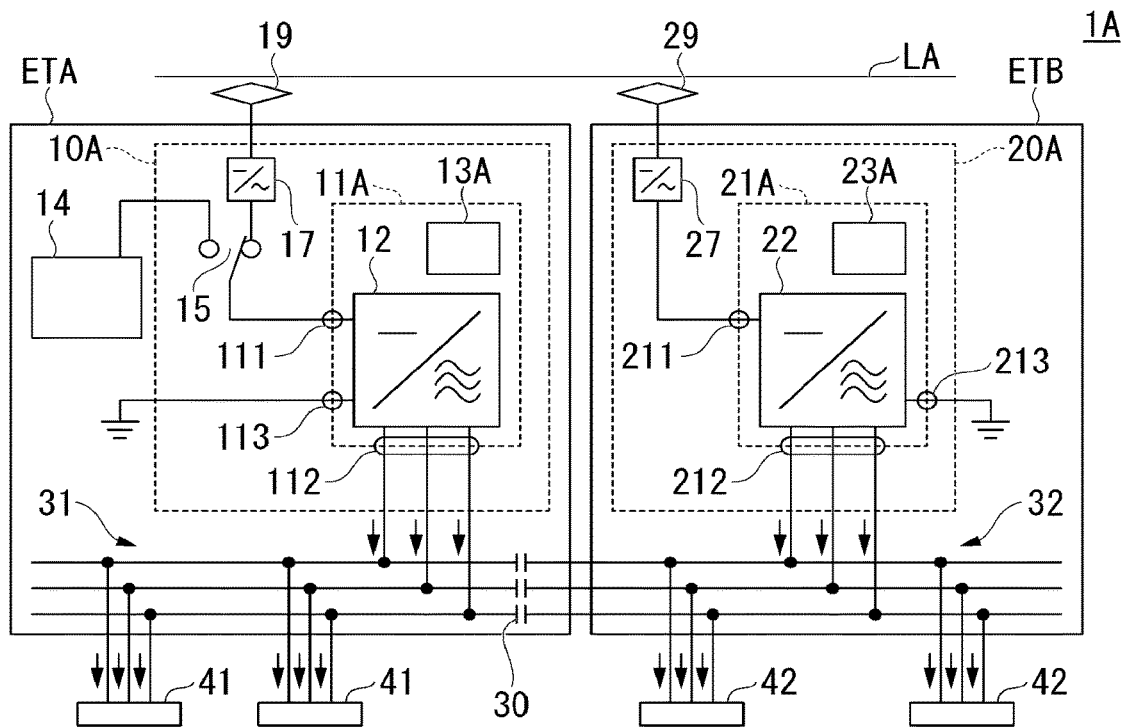
FIG. 2 is a configuration diagram of a power supply system for an electric motor car according to a second embodiment.

First, a configuration of a power supply system 1A for an electric motor car will be described. FIG. 2 is a configuration diagram of a power supply device for an electric motor car according to the second embodiment. An AC voltage is applied to an overhead wire LA relating to an electric motor car ETA and an electric motor car ETB.

The power supply system 1A for the electric motor car includes a power conversion device 10A, a power conversion device 20A, lead wires 31 and 32, and a power receiving and feeding contactor device 30 (a power receiving and feeding contactor).

The power conversion device 10A and the power conversion device 20A correspond to the power conversion device 10 and the power conversion device 20 of the power supply system 1 for the electric motor car.

The power conversion device 10A includes a power supply device 11A for an electric motor car, a power storage device 14, a switch 15, and a converter 17.

The power conversion device 20A includes a power supply device 21A for the electric motor car and a converter 27.

The power supply system 1A for the electric motor car further includes the converters 17 and 27 with respect to the power supply system 1 according to the first embodiment as described above and there is a difference in that the power supply devices 11A and 12A for the electric motor car are provided in place of the power supply devices 11 and 12 for the electric motor car.

The converter 17 of the power conversion device 10A has a first terminal connected to a power collecting device 19 and a second terminal connected to a first terminal of the switch 15. That is, the power collecting device 19, the converter 17, and the switch 15 are electrically connected in series in that order. The converter 17 is a power converter that converts AC power on a feeder side and DC power on the power supply device 11A side for the electric motor car.

The power supply device 11A for the electric motor car includes a first terminal 111, a second terminal 112, a ground terminal 113, an inverter 12 (a conversion unit), and a control unit 13A. The first terminal 111 is connected to one of the power storage device 14 and the converter 17 provided within the above-described formation, for example, via the switch 15. The control unit 13A performs control and collection of information about items similar to those of the control unit 13 of the first embodiment. Further, the control unit 13A collects information regarding a state of the converter 17 and controls the power conversion of the converter 17.

The converter 27 of the power conversion device 20A has a first terminal connected to the power collecting device 29 and a second terminal connected to the first terminal 211 of the power supply device 21A for the electric motor car.

The power supply device 21A for the electric motor car includes a first terminal 211, a second terminal 212, a ground terminal 213, an inverter 22 (a conversion unit), and a control unit 23A. The control unit 23A performs control and collection of information regarding items similar to those of the control unit 23 of the first embodiment. Further, the control unit 23A collects information about the state of converter 27 and controls the power conversion of the converter 27. Also, the converter 27 is similar to the converter 17.

An operation of the power supply system 1A for the electric motor car will be described.

The converters 17 and 27 convert a voltage of the overhead wire LA (hereinafter referred to as an overhead wire voltage) into a DC voltage. The inverters 12 and 22 convert the DC voltage into an AC different from that of the above-described overhead wire voltage. The operation of the power supply system 1A for the electric motor car in the present embodiment other than the above is similar to the operation of each part in each of the basic operation state, the first operation state, and the second operation state shown in the above-described first embodiment.

According to the above-described embodiment, the switch 15 electrically connects the first terminal 111 to one of the overhead wire LA to which an AC voltage is applied and the power storage device 14. For example, even if the AC voltage is applied to the overhead wire LA, each of the converters 17 and 27 converts the AC voltage into a DC voltage, thereby achieving an effect similar to that of the first embodiment.

Third Embodiment

A third embodiment will be described in detail with reference to the drawings. In the third embodiment, an example in which lead wires within a formation are integrated into one group and inverter circuits within the formation perform a parallel synchronous operation will be described. Hereinafter, differences from the first embodiment will be mainly described.

Figure 3:
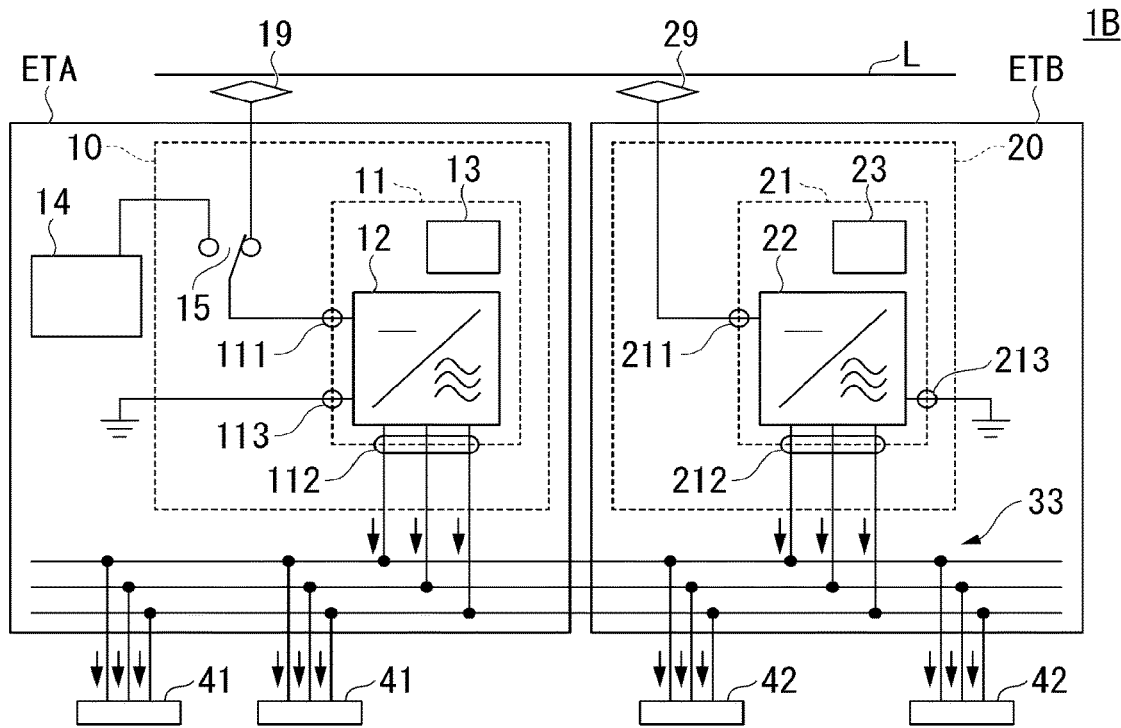
FIG. 3 is a configuration diagram of a power supply system for an electric motor car according to a third embodiment.

First, a configuration of a power supply system 1B for an electric motor car will be described. FIG. 3 is a configuration diagram of the power supply device for the electric motor car according to the third embodiment.

The power supply system 1B for the electric motor car includes a power conversion device 10, a power conversion device 20, and a lead wire 33. As described above, in the power supply system 1B for the electric motor car, the power receiving and feeding contactor device 30 provided between the lead wires 31 and 32 in the power supply system 1 for the electric motor car according to the first embodiment is deleted and a lead wire 33 is provided across all cars within the formation in place of the lead wires 31 and 32. Also, the power conversion devices 10 and 20 in the power supply system 1B for the electric motor car are connected in parallel to each other and enable a parallel synchronous operation.

An operation of the power supply system 1B for the electric motor car will be described.

The description of the first embodiment other than that of the power receiving and feeding contactor device 30 can be referred to in the description of the power supply system 1B for the electric motor car.

Here, the third embodiment will be compared with the example of the first embodiment. In the above-described first embodiment, a power feeding range is adjusted by the power receiving and feeding contactor device 30. For example, when the power receiving and feeding contactor device 30 is turned off, there is a range in which electric power cannot be supplied from the power storage device 14 before the power receiving and feeding contactor device 30 is brought into a conductive state. There may be a period of a power failure state in which electric power is not fed to a load such as the electric motor 42 provided outside the power feeding range.

On the other hand, according to the above-described embodiment, the power feeding range of the inverter 12 extends, for example, to the entire electric motor car formation provided with the lead wire 33 without the power receiving and feeding contactor device 30. Thereby, when electric power with which the power storage device 14 is charged is used, the electric power from the power storage device 14 can be supplied to all loads connected to the lead wire 33 without operating the power receiving and feeding contactor device 30.

Furthermore, the inverters 12 and 22 according to the embodiment can perform a parallel synchronous operation. When the inverters synchronously operate in parallel to each other, a voltage is applied to the lead wire 33.

Also, if at least one of the inverters 12 and 22 applies a voltage to the lead wire, a state in which the voltage is applied to the lead wire 33 is maintained. Even if the operation state of the inverter 12 is changed from the basic operation state to the first operation state or the second operation state, the state in which the voltage is applied to the lead wire is maintained when at least one inverter circuit other than the inverter 12 applies a voltage to the lead wire. That is, when the inverter 22 continues the voltage-applied state without responding to the change in the state of the inverter 12, the voltage is continuously applied to the lead wire. Thereby, the control unit 13 can switch the operation state of the inverter 12 without stopping power feeding to the load and can start charging or discharging of the power storage device.

Fourth Embodiment

A fourth embodiment will be described in detail with reference to the drawings. In the fourth embodiment, an example in which a power failure is prevented from occurring when an operation state is switched will be described. Hereinafter, differences from the first embodiment will be mainly described.

Figure 4:
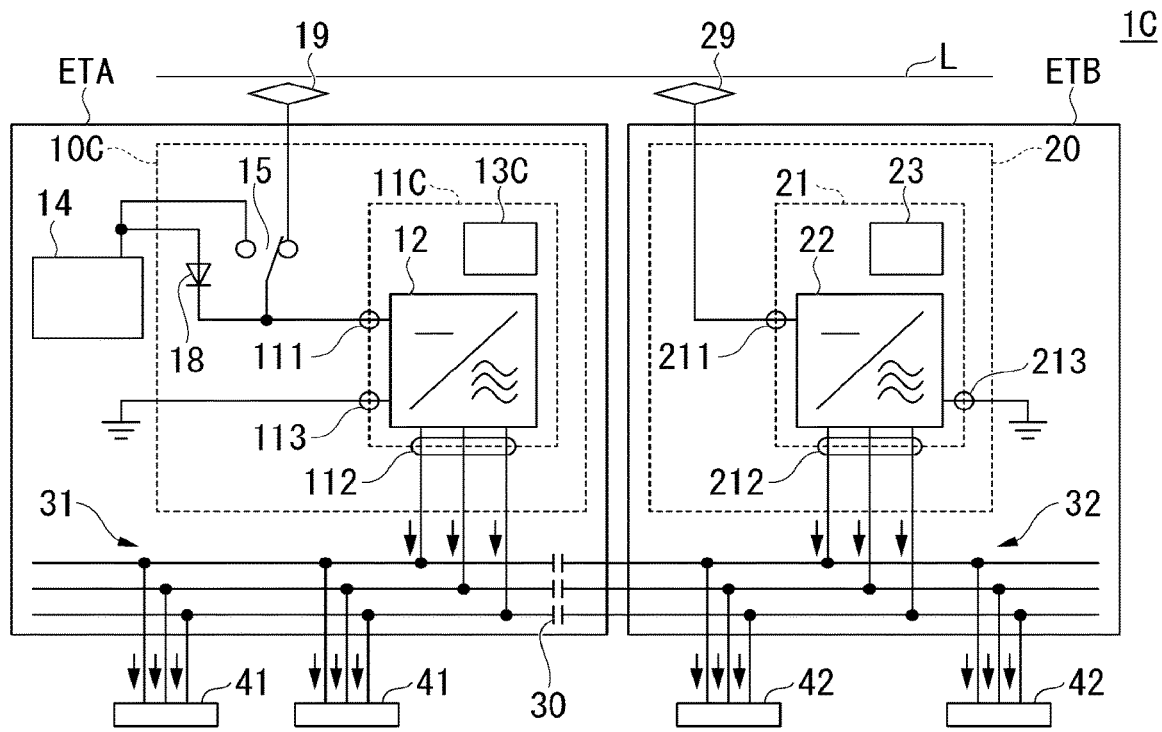
FIG. 4 is a configuration diagram of a power supply system for an electric motor car according to a fourth embodiment.

First, a configuration of a power supply system 1C for an electric motor car will be described. FIG. 4 is a configuration diagram of a power supply device for the electric motor car according to the fourth embodiment.

The power supply system 1C for the electric motor car includes a power conversion device 10C, a power conversion device 20, lead wires 31 and 32, and a power receiving and feeding contactor device 30.

The power conversion device 10C corresponds to the power conversion device 10. For example, the power conversion device 10C includes a power supply device 11 for the electric motor car, a power storage device 14, a switch 15, and a charging diode 18 (a rectifier).

The charging diode 18 has an anode connected to a positive electrode of the power storage device 14 and a cathode connected to a first terminal 111 of the power supply device 11 for the electric motor car. As shown in FIG. 4, the switch 15 includes a first electrode connected to the power collecting device 19, a second electrode connected to the positive electrode of the power storage device 14, and a common electrode connected to the first terminal 111 of the power supply device 11 for the electric motor car.

An operation of the power supply system 1C for the electric motor car will be described.

As described above, a path of an electric current from the positive electrode of the power storage device 14 to the inverter 12 in the power conversion device 10C includes a path along which the electric current passes through the switch 15 and a path along which the electric current passes through the charging diode 18. The power conversion device 10C has the above-described two paths, so that the inverter 12 operates using the overhead wire L side as a power supply when the overhead wire voltage is higher than the voltage of the power storage device 14. When the overhead wire voltage is lower than the voltage of the power storage device 14, the inverter 12 operates using the power storage device 14 side as a power supply.

According to the above-described embodiment, in the power supply system 1C for the electric motor car, the charging diode 18 is connected in parallel to the second electrode of the switch 15 and the common electrode of the switch 15 and a direction of the electric current when the power storage device 14 is discharged is arranged in a forward direction, so that an electric current flows in a direction in which the power storage device is discharged. Even if the overhead wire voltage may be instantaneously lost when an instantaneous power failure occurs in the overhead wire L or when passing through a dead section, the power supply system 1C for the electric motor car can secure electric power for causing the electric motor 41 and the like to function using the power storage device 14 as a power supply without requiring a switching operation of the switch 15. Because this switching operation is performed according to a switching operation of the charging diode 18, the power supply is switched without causing an instantaneous power failure.

At least a part of the control device of each of the above-described embodiments may be implemented by a software function unit or all thereof may be implemented by a hardware function unit such as an LSI circuit.

According to at least one embodiment described above, a power supply device for an electric motor car includes a first terminal, a second terminal, and a conversion unit. The first terminal is electrically connected to one of a power storage device and an overhead wire provided within a formation of electric motor cars. The second terminal is electrically connected to a lead wire together with a plurality of electric motors within the formation, a host power supply device, an external power supply device different from the host power supply device. The conversion unit converts electric power between the first terminal and the second terminal under an operation state between a first operation state in which first electric power supplied from the plurality of electric motors and the external power supply device is received via the second terminal and a DC voltage is generated at the first terminal according to a regenerative operation of the conversion unit to charge the power storage device and a second operation state in which second electric power supplied from one of the power storage device and the overhead wire is received via the first terminal, a part of the second electric power is converted into third electric power according to a powered operation of the conversion unit, and the third electric power is output from the second terminal, so that it is possible to provide a power supply device for an electric motor car that is simply formed. Thereby, it is possible to drive a plurality of electric motors with electric power with which the power storage device is charged.

All the embodiments described above have been presented by way of example only and are not intended to limit the scope of the inventions. These embodiments may be embodied in a variety of other forms. Various omissions, substitutions, and changes may be made without departing from the spirit of the inventions. Such embodiments or modifications are included in the inventions described in the accompanying claims and their equivalents.

REFERENCE SIGNS LIST 1, 1A, 1B, 1C Power supply system for electric motor car
10, 10A, 10C, 20, 20A Power conversion device
11, 11A, 11C, 21, 21A Power supply device for electric motor car
12, 22 Inverter (conversion unit)
13, 13A, 13C, 23 Control unit
14 Power storage device
15 Switch
17, 27 Converter
18 Charging diode
19, 29 Power collecting device
30 Power receiving and feeding contactor device (power receiving and feeding contactor)
111, 211 First terminal
112, 212 Second terminal
113, 213 Ground terminal
ETA, ETB Electric motor car
L, LA Overhead wire

The invention claimed is:

1. A power supply system for an electric motor car, comprising:
a first terminal electrically connected to one of a power storage device and an overhead wire provided within a formation of electric motor cars;
a second terminal electrically connected to a lead wire together with a plurality of electric motors within the formation, a host power supply device, an external power supply device different from the host power supply device; and
a conversion unit configured to convert electric power between the first terminal and the second terminal under an operation state between a first operation state in which first electric power supplied from at least one of the plurality of electric motors and the external power supply device is received via the second terminal and a direct current (DC) voltage is generated at the first terminal according to a regenerative operation of the conversion unit to charge the power storage device and a second operation state in which second electric power supplied from one of the power storage device and the overhead wire is received via the first terminal, a part of the second electric power is converted into third electric power according to a powered operation of the conversion unit, and the third electric power is output from the second terminal.

2. The power supply system for the electric motor car according to claim 1, comprising a switch configured to electrically connect the first terminal to one of the overhead wire and the power storage device.

3. The power supply system for the electric motor car according to claim 2, wherein the switch electrically connects the first terminal to one of the overhead wire to which an alternating current (AC) voltage is applied and the power storage device.

4. The power supply system for the electric motor car according to claim 2,
wherein a power receiving and feeding contactor is provided between the host power supply device and the external power supply device and
wherein the switch is formed to perform switching between power reception from the overhead wire and charging of the power storage device while the power receiving and feeding contactor is in a conductive state.

5. The power supply system for the electric motor car according to claim 2,
wherein the switch includes
a first electrode connected to the overhead wire;
a second electrode connected to the power storage device;
a common electrode connected to the first terminal and wherein the power supply system further comprises
a rectifier connected in parallel between the second electrode and the common electrode and configured to cause an electric current to flow in a direction in which the power storage device is discharged.

6. The power supply system for the electric motor car according to claim 2, wherein the conversion unit includes a plurality of conversion units which are connected in parallel to each other and in which a parallel synchronous operation is possible.

* * * * *